(12) United States Patent
Petri

(10) Patent No.: US 6,300,568 B1
(45) Date of Patent: Oct. 9, 2001

(54) GROMMET STRIP BENDABLE ALONG ORTHOGONALLY RELATED DIRECTIONS

(76) Inventor: Hector D. Petri, 384 Edmands Rd., Framingham, MA (US) 01701

( * ) Notice: Subject to any disclaimer, the term of this patent is extended or adjusted under 35 U.S.C. 154(b) by 0 days.

(21) Appl. No.: 09/347,728

(22) Filed: Jul. 6, 1999

(51) Int. Cl.[7] ................................................ H02G 3/22
(52) U.S. Cl. ............................. 174/65 G; 174/153 G; 52/716.1
(58) Field of Search ................... 174/65 R, 65 G, 174/151, 152 G, 153 G; 16/2.1, 2.2; 248/56; 52/716.1, 716.8, 717.01, 717.03

(56) References Cited

U.S. PATENT DOCUMENTS

| | | | |
|---|---|---|---|
| 3,934,385 | * | 1/1976 | Paulus et al. ........................... 52/717 |
| 4,769,966 | * | 9/1988 | Petri ....................................... 52/716 |
| 5,343,669 | * | 9/1994 | Petri ..................................... 52/716.8 |
| 5,422,436 | * | 6/1995 | Zachrai ............................... 174/65 R |
| 5,726,392 | * | 3/1998 | Farr et al. ........................... 174/65 G |
| 6,093,470 | * | 7/2000 | Petri ..................................... 52/716.8 |

* cited by examiner

*Primary Examiner*—Dean A. Reichard
*Assistant Examiner*—Angel R. Estrada
(74) *Attorney, Agent, or Firm*—John E. Toupal; Harold G. Jarcho

(57) ABSTRACT

A grommet strip including a metallic, elongated base having first base portions spaced apart along a longitudinal axis and each having a given width W; and second base portions each joining a longitudinally spaced apart pair of the first base portions, each of the second base portions having a width substantially less than W so as to allow bending of the elongated base in orthogonally related directions about the longitudinal axis. Also included are first fingers extending upwardly from longitudinally aligned first edges of at least some of the first base portions; and second fingers extending upwardly from longitudinally aligned second edges of at least some of the first base portions. The first edges are substantially transversely aligned with the second edges; and the first fingers, the second fingers and the base form a longitudinally extending channel for receiving an edge portion of a wall.

26 Claims, 3 Drawing Sheets

GROMMET STRIP BENDABLE ALONG ORTHOGONALLY RELATED DIRECTIONS

BACKGROUND OF THE INVENTION

This invention relates generally to a grommet strip for covering an exposed edge of a wall and, more particularly, to an electrically insulating grommet strip for covering the exposed edges of openings in electrical equipment housings.

Electrical equipment housings frequently possess openings for the passage of electrical wires. Generally, such openings are equipped with grommets or bushings that cover and insulate the exposed edges of the openings. A common grommet is made of rubber or a similar resilient material and consists of a pair of annular spaced apart flange portions internally joined by a cylindrical portion. The cylindrical portion projects through an opening and the flange portions engage the peripheral wall portions thereof. Disadvantages of such grommets include the requirement for large inventories to accommodate openings of various size, and their inapplicability to openings of other than circular shape.

The above problems are somewhat alleviated by a grommet strip having a flat, elongated base from opposite edge of which project longitudinally spaced apart pair of fingers. The strip can be cut to desired length and then applied to an opening with the base engaging the edge of the opening and the fingers engaging peripheral portions thereof. Such a grommet strip is disclosed in British Patent No. 849,761. However, certain disadvantages persist for even the above described grommet strip. For example, the installation of the grommet strip into openings of complex shape requires the use of an adhesive and is, therefore, quite labor intensive.

Improved grommet strips are disclosed in U.S. Pat. Nos. 4,769,966 and 5,343,669. Those grommet strips comprise resiliently coated spring tempered substrate strips which can be securely mounted over an exposed edge of a wall without the use of adhesives. However, the multiple-axis flexibility of the grommet strips is limited so as to prevent their use over openings formed by non-cylindrical, tubular wall sections used in applications such as aircraft.

The object of this invention, therefore, is to provide an improved grommet for covering the exposed edges of openings in electrical housings.

SUMMARY OF THE INVENTION

The invention is a grommet strip including a metallic, elongated base having first base portions spaced apart along a longitudinal axis and each having a given width W; and second base portions each joining a longitudinally spaced apart pair of the first base portions, each of the second base portions having a width substantially less than W so as to allow bending of the elongated base in orthogonally related directions about the longitudinal axis.

Also included are first fingers extending upwardly from longitudinally aligned first edges of at least some of the first base portions; and second fingers extending upwardly from longitudinally aligned second edges of at least some of the first base portions. The first edges are substantially transversely aligned with the second edges; and the first fingers, the second fingers and the base form a longitudinally extending channel for receiving an edge portion of a wall. A non-metallic coating is secured to a bottom surface of the base. Because of its multiple axis flexibility, the grommet strip can be secured over the edge of openings terminating non-cylindrical, tubular wall portions.

According to one feature of the invention, the second base portions have a uniform width w. This feature provides the strip with longitudinally uniform gripping characteristics.

According to other features of the invention W is at least two times w, and preferably at least three times w. The reduced relative widths of the second base portions enhance desired multiple axis flexibility of the strip.

According to another embodiment of the invention, the second base portions are longitudinally aligned with the longitudinal axis. This embodiment exhibits uniform flexibility in opposite transverse directions.

According to another embodiment of the invention, the second base portions are transversely spaced from the longitudinal axis. Transverse spacing of the second base portions facilitates selection of transverse flexibility characteristics of the grommet strip.

According to one feature of the above embodiment, the second base portions are transversely spaced in alternating opposite directions from the longitudinal axis. This feature establishes uniform transverse flexibility in opposite directions.

According to another feature of the above embodiment, all of the second base portions are transversely spaced in the same direction from the longitudinal axis. This feature provides enhanced transverse flexibility in a transverse direction opposite to the same direction of second base portion spacing.

According to yet another feature of the invention, a first finger extends upwardly from each of the first edges, a second finger extends upwardly from each of the second edges, and the first and second fingers are transversely aligned. These features enhance gripping strength of the grommet strip.

According to additional features of the invention, each of the fingers has a lower portion joined to one of the edges, and an upper portion extending upwardly from the lower portion, the lower portion is bent into the channel, and the upper portion is bent away from the channel so as to provide the finger with a V-shaped section. These features further enhance the gripping forces provided by the grommet strip.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 2:
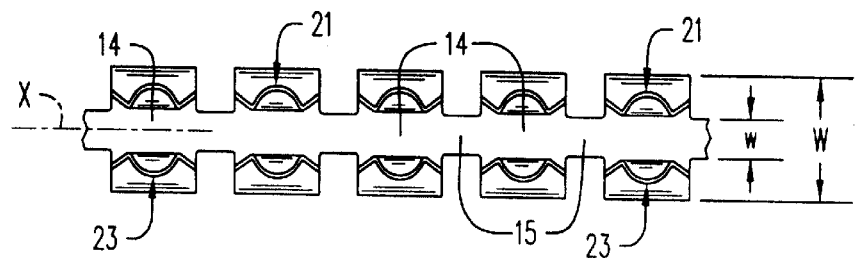
FIG. 2 is a top view of the grommet strip substrate shown in FIG. 1.
Figure 1:
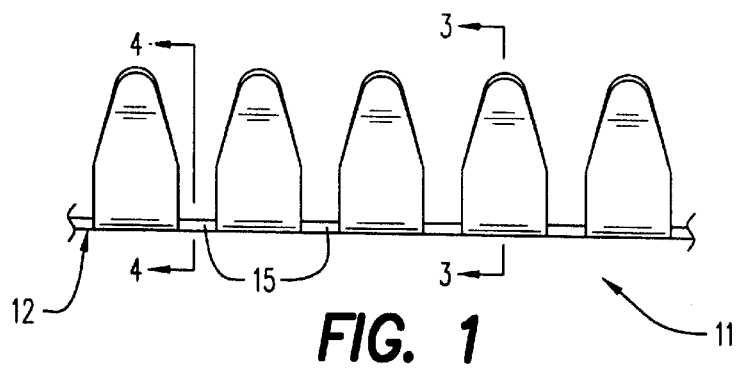
FIG. 1 is an elevational view of a grommet strip substrate according to the invention.
Figure 3:
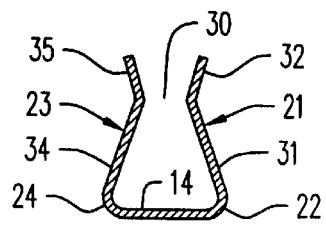
FIG. 3 is a cross sectional view taken along lines 3—3 of FIG. 1.
Figure 4:
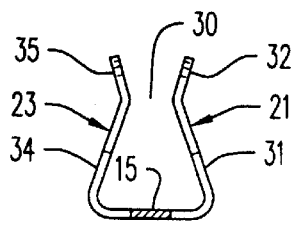
FIG. 4 is a cross sectional view taken along lines 4—4 of FIG. 1.
Figure 5:
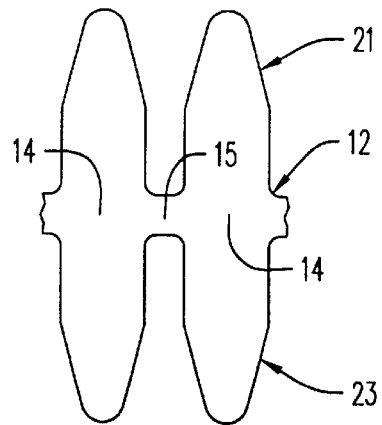
FIG. 5 is a plan view of a metallic stamping prior to being formed into the grommet strip substrate shown in FIG. 1.

Illustrated in FIGS. 1–4 is a spring tempered metallic grommet strip substrate 11. After being stamped and prior to being formed, the substrate strip 11 has the appearance depicted in FIG. 5. Included in the strip 11 is an elongated base portion 12 having a longitudinal axis X. The elongated base portion 12 is formed by first base portions 14 spaced apart along the longitudinal axis X and second base portions 15 joining each longitudinally spaced apart pair of the first base portions 14. As shown in FIGS. 2, 4 and 5, the second base portions are aligned with the longitudinal axis X and have a width w substantially less than the width w of the first base portions 14. Preferably, the width W of the first base portions 14 is at least two times the width w of the second base portions 15 and optimally, the width W is at least three times the width w.

The substrate strip 11 also includes first fingers 21 extending upwardly from longitudinally aligned first edges 22 of the first base portions 14 and second fingers 23 projecting upwardly from longitudinally aligned second edges 24 of the first base portions 14. As shown, the first fingers 21 and second fingers 23 are in transverse alignment. Together, the fingers 21, 23 and the base portions 12 form an elongated channel 30. Each of the first fingers 21 includes a lower portion 31 joined to one of the first edges 22 and bent inwardly into the channel 30 and an upper portion 32 bent away from the channel 30 so as to provide each finger 21 with a V-shaped section. Similarly, each of the second fingers 23 includes a lower portion 34 joined to one of the second edges 24 and bent inwardly into the channel 30 and an upper portion 35 bent away from the channel portion 30 so as to provide a V-shaped section.

Figure 6:
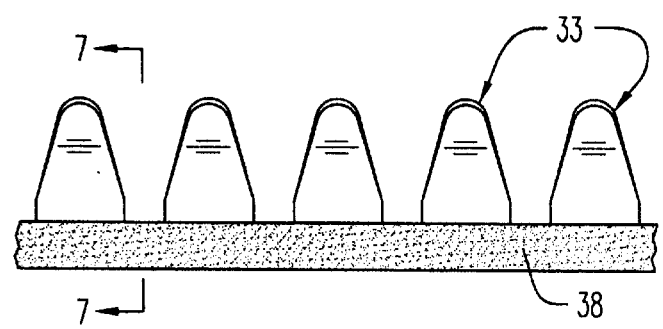
FIG. 6 is an elevational view of a grommet strip formed with the substrate shown in FIGS. 1–4.
Figure 7:
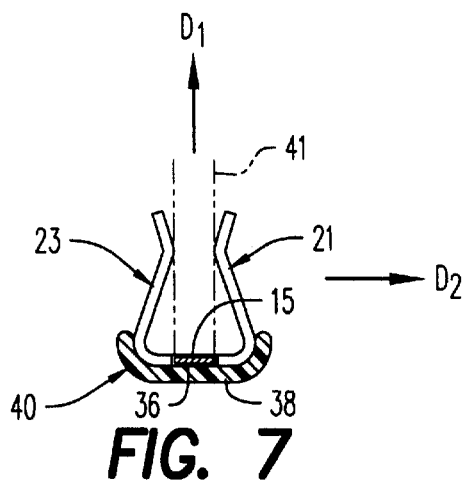
FIG. 7 is a cross sectional view taken along lines 7—7 of FIG. 6.
Figure 8:
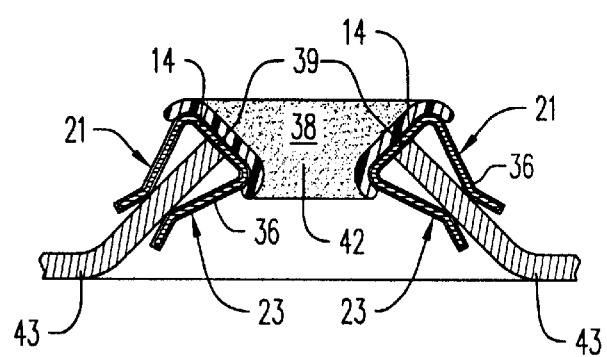
FIG. 8 is a sectional view of the grommet strip mounted on an exposed edge of an opening in a wall.
Figure 9:
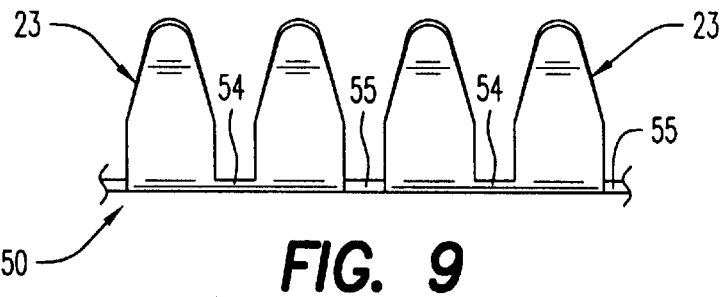
FIG. 9 is an elevational view of another grommet strip substrate embodiment according to the invention.

After being formed, the substrate strip 11 is entirely coated with a plastic material coating 36 as shown in FIG. 7. Subsequently a suitable resilient non-metallic coating strip 38 such as nylon or other appropriate thermosetting or thermoplastic polymer is applied to the bottom surface of the entire elongated base 12 and to lower outer surfaces of the first and second fingers 21, 23. As also shown in FIGS. 6 and 7 the coating 36 and strip 38 each have a limited projection above the base 12 so as to maintain voids between major length portions of the fingers 21 and 23. A resultant elongated grommet strip 40 then can be secured over an edge of a wall 41 (FIG. 7) without a requirement for adhesives because of the gripping force provided by the first and second fingers 21, 23. The width W of the first base portions 14 is selected to accommodate the thickness of the wall 41 while the substantially lesser width w of the second base portions 15 allows the grommet strip 40 to bend in either orthogonally related directions D1 and D2. Thus, the grommet strip 40 can be applied over a wall edge 39 formed by an opening 42 in a non-cylindrical wall such as a tapered funnel shaped wall 43 shown in FIG. 8. Typically, the opening 42 would accommodate electrical wire bundles (not shown) which would be protected from abrasion damage by the coating 38 on the grommet strip 40.

Figure 10:
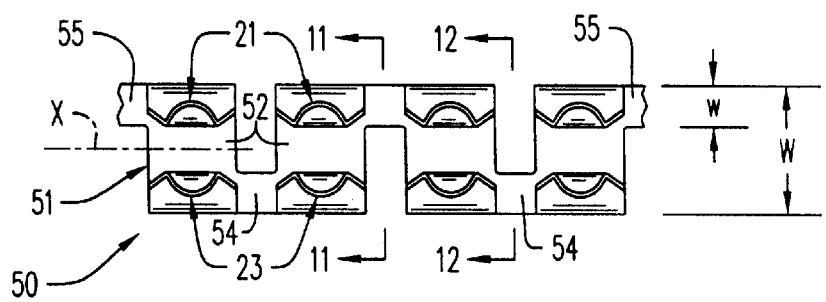
FIG. 10 is a top view of the grommet strip substrate shown in FIG. 9.
Figure 11:
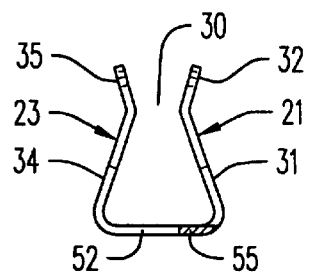
FIG. 11 is a cross sectional view taken along lines 11—11 of FIG. 10.
Figure 12:
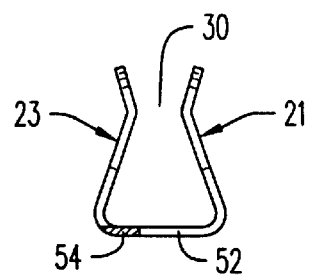
FIG. 12 is a cross sectional view taken along lines 12—12 of FIG. 10.

Illustrated in FIGS. 10–12 is another grommet strip substrate embodiment 50 of the invention. The substrate strip 50 includes an elongated base 51 formed by first base portions 52 spaced apart along a longitudinal axis X and second base portions 54 joining each longitudinally spaced apart pair of the first base portions 52. Again, the substrate 50 also includes upwardly projecting transversely aligned first and second fingers 21, 23 to form an elongated channel 30. As in the above described substrate strip 11, the uniform widths W of the first base portions 52 is substantially greater than the uniform widths w of the second base portions 54. Preferably, the width W again is at least two times the width w and, optimally, the width W is at least three times the width w. However, in the embodiment 50, the second base portions 54 are transversely spaced in alternating opposite directions from the longitudinal axis X as shown. Because of the reduced widths w of the second base portions 54, the embodiment 50 also can be bent in orthogonally related directions to accommodate use in the manner described above. Also, prior to use of the embodiment 50, a non-metallic covering would be applied to the lower surfaces of the base 51 and lower outer surface portions of the fingers 21, 23 as described above.

Figure 13:
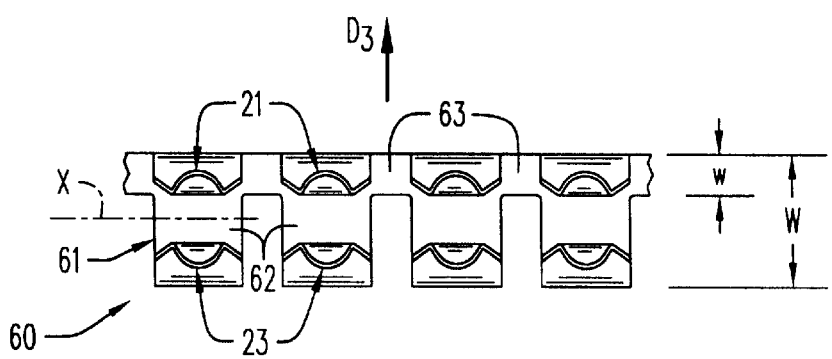
FIG. 13 is a plan view of another grommet strip substrate embodiment according to the invention.

Illustrated in FIG. 13 is another grommet strip substrate embodiment 60 including an elongated base portion 61. Forming the base portion 61 are first base portions 62 uniformly spaced apart along a longitudinal axis X and second base portions 63 separating each spaced apart pair of the first base portions 62. Again, transversely aligned first and second fingers 21, 23 project upwardly from outer edges of the first base portions 62 in the manner described above for the substrate embodiment 11. However, in the substrate embodiment 60, all of the second base portions 63 are transversely spaced in the same direction D3 from the longitudinal axis X. However, the widths W of the first base portions 62 again are substantially greater than the widths of the second base portions 63 with the widths W being at least two times greater than the widths w and, optimally, three times the widths 2. The substrate embodiment 60 would be covered with a non-metallic coating as described above. Because all of the second base portions 63 are transversely spaced in the same direction D3, bending characteristics in that direction are enhanced.

Obviously, many modifications and variations of the present invention are possible in light of the above teachings. It is to be understood, therefore, that the invention can be practiced otherwise than as specifically described.

What is claimed is:

1. A grommet strip comprising:
   a metallic elongated base including continuous first base portions spaced apart along a longitudinal axis and each having a given width W; and second base portions each joining a longitudinally spaced apart pair of said first base portions, each of said second base portions having a width substantially less than W so as to allow bending of said elongated base in orthogonally related directions about said longitudinal axis;
   first fingers extending upwardly from longitudinally aligned first edges of at least some of said first base portions;
   second fingers extending upwardly from longitudinally aligned second edges of at least some of said first base portions; said first edges being substantially transversely aligned with said second edges; and said first fingers, said second fingers and said base forming a longitudinally extending channel for receiving an edge portion of a wall; and
   a non-metallic coating secured to at least a bottom surface of said base, and wherein the projection of said coating above said base is limited so as to provide voids between major length portions of said first fingers and between major length portions of said second finger.

2. A grommet strip according to claim 1 wherein said second base portions have a uniform width w.

3. A grommet strip according to claim 2 wherein W is at least two times w.

4. A grommet strip according to claim 3 wherein W is at least three times w.

5. A grommet strip according to claim 1 wherein said second base portions are longitudinally aligned with said longitudinal axis.

6. A grommet strip according to claim 5 wherein said second base portions have a uniform width w.

7. A grommet strip according to claim 6 wherein W is at least two times w.

8. A grommet strip according to claim 7 wherein W is at least three times w.

9. A grommet strip according to claim 1 wherein said second base portions are transversely spaced from said longitudinal axis.

10. A grommet strip according to claim 9 wherein said second base portions have a uniform width w.

11. A grommet strip according to claim 10 wherein W is at least two times w.

12. A grommet strip according to claim 11 wherein W is at least three times w.

13. A grommet strip according to claim 9 wherein said second base portions are transversely spaced in alternating opposite directions from said longitudinal axis.

14. A grommet strip according to claim 13 wherein said second base portions have a uniform width w.

15. A grommet strip according to claim 14 wherein W is at least two times w.

16. A grommet strip according to claim 15 wherein W is at least three times w.

17. A grommet strip according to claim 9 wherein all of said second base portions are transversely spaced in the same direction from said longitudinal axis.

18. A grommet strip according to claim 1 wherein a said first finger extends upwardly from each of said first edges, a said second finger extends upwardly from each of said second edges, and said first and second fingers are transversely aligned.

19. A grommet strip according to claim 18 wherein each of said fingers comprises a lower portion joined to one of said edges, and an upper portion extending upwardly from said lower portion, said lower portion is bent into said channel, and said upper portion is bent away from said channel so as to provide said finger with a V-shaped section.

20. A grommet strip according to claim 1 wherein said elongated base is a metallic stamping.

21. A grommet strip according to claim 1 wherein said coating comprises a non-metallic material coated on substantially all surfaces of said base, said first fingers and said second lingers.

22. A grommet strip according to claim 21 wherein said elongated base is a metallic stamping.

23. A grommet strip according to claim 21 wherein said coating further comprises a resilient, non-metallic strip covering said bottom surface and lower outer surfaces of said first and second fingers.

24. A grommet strip according to claim 23 wherein said elongated base is a metallic stamping.

25. A grommet strip according to claim 1 wherein said coating comprises a resilient non-metallic strip covering said bottom surface and lower outer surfaces of said first and second fingers.

26. A grommet strip according to claim 25 wherein said elongated base is a metallic stamping.

* * * * *

UNITED STATES PATENT AND TRADEMARK OFFICE
CERTIFICATE OF CORRECTION

PATENT NO. : 6,300,568 B1
DATED : October 9, 2001
INVENTOR(S) : Hector D. Petri

Page 1 of 1

It is certified that error appears in the above-identified patent and that said Letters Patent is hereby corrected as shown below:

Column 6,
Line 20, "lingers" should read -- fingers --.

Signed and Sealed this

Fifth Day of March, 2002

Attest:

*Attesting Officer*

JAMES E. ROGAN
*Director of the United States Patent and Trademark Office*